United States Patent [19]

Legrand

[11] 4,250,743
[45] Feb. 17, 1981

[54] SUPPORT DEVICE FOR MEASURING INSTRUMENTS IN THE AIR INTAKE OF A TURBOJET

[75] Inventor: Paul J. Legrand, Vaux le Penil, France

[73] Assignee: Societe Nationale d'Etude et de Construction de Moteurs d'Aviation, Paris, France

[21] Appl. No.: 88,155

[22] Filed: Oct. 25, 1979

[30] Foreign Application Priority Data

Oct. 27, 1978 [FR] France ............................... 78 31258

[51] Int. Cl.³ ........................ G01L 7/00; G01M 15/00
[52] U.S. Cl. .................................... 73/115; 73/756
[58] Field of Search ................. 73/756, 212, 182, 115, 73/147

[56] References Cited

U.S. PATENT DOCUMENTS

| | | | |
|---|---|---|---|
| 3,868,625 | 2/1975 | Speigner | 73/115 |
| 3,938,319 | 2/1976 | Thomson | 73/115 |

FOREIGN PATENT DOCUMENTS 1080143 8/1967 United Kingdom ...................... 73/22

571722 9/1977 U.S.S.R. ..................................... 73/115

OTHER PUBLICATIONS

J. of Aircraft, vol. 6, No. 2 (Mar.-Apr. 1969), New York, pp. 116–122.
J. of Aircraft, vol. 5, No. 3 (May-Jun. 1968) New York, pp. 221–229.

*Primary Examiner*—Donald O. Woodiel
*Attorney, Agent, or Firm*—Oblon, Fisher, Spivak, McClelland & Maier

[57] ABSTRACT

A support device for pressure measuring instruments in the air intake of a turbojet having support arms disposed in a plane perpendicular to the longitudinal axis of the air intake, being secured at one end to the turbojet housing and joined in pairs at their other ends by a fusiform body and converging in such pairs upon a radius. The inner joined end of one arm of each pair constitutes a fork, while the inner end of the other arm of each pair constitutes a fork, and the stud and fork form a bore in which is received a threaded interlocking component formed as a fusiform part at its two extremities outside the fork and stud.

4 Claims, 10 Drawing Figures

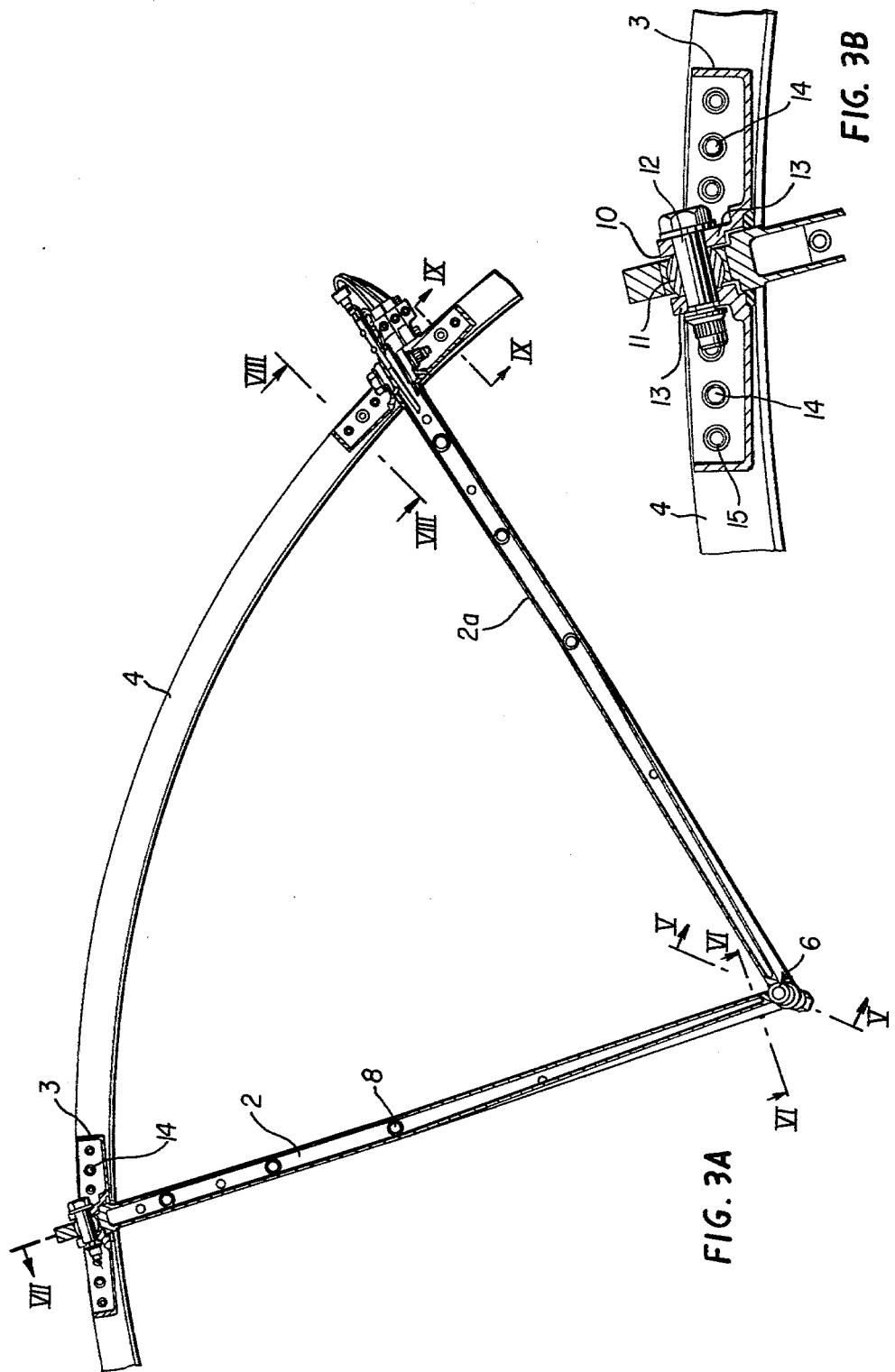

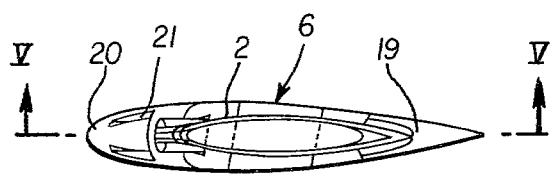
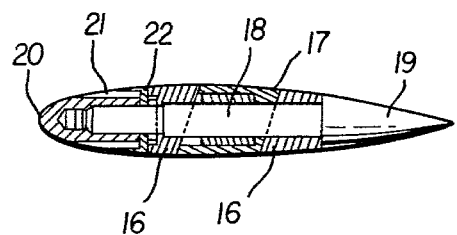
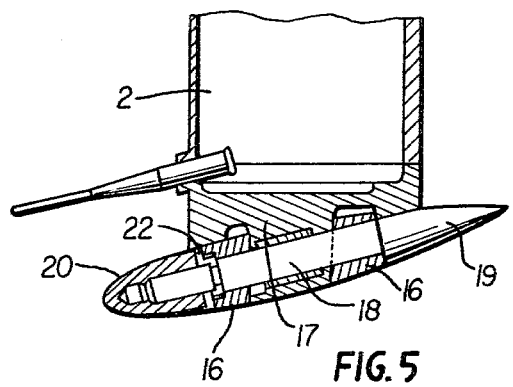
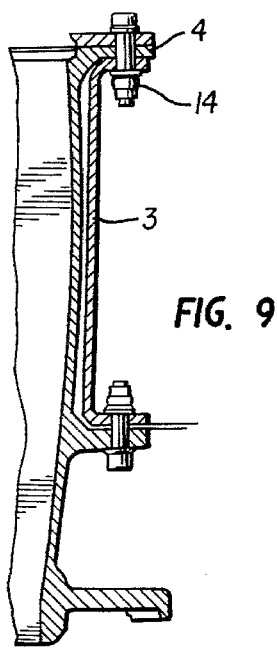
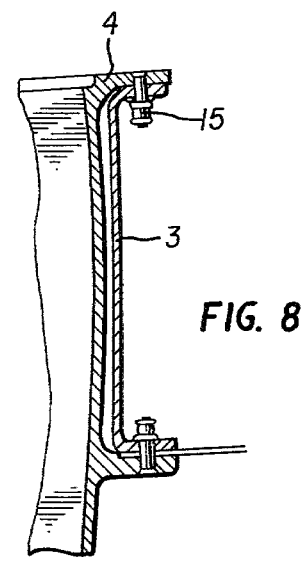

SUPPORT DEVICE FOR MEASURING INSTRUMENTS IN THE AIR INTAKE OF A TURBOJET

BACKGROUND OF THE INVENTION

1. Field of the Invention

The present invention relates generally to a support device for measuring instruments disposed in the air intake of a turbojet.

2. Description of the Prior Art

The installation of components for measuring test pressures on a fan which does not have intake guide vanes poses difficult mechanical reliability problems on high by-pass ratio engines.

In practice, pressure taking instruments are mounted on support arms which cannot be affixed to the rotating hub. Since these support arms are affixed radially at one of their extremities to the turbojet housing, they obviously have a large overhang. As a result, these arms may be the locus of sustained vibrations, capable of creating a rupture, the consequences of which would be very serious.

SUMMARY OF THE INVENTION

An object of the present invention, therefore, is to provide a device enabling satisfactory resolution of these problems.

Thus, in accordance with the present invention, the arms extending in a plane perpendicular to the longitudinal axis of the air intake are mounted at one of their extremities on the turbojet housing and joined in pairs at their other extremities by means of a fusiform body, with the arms being mounted so as to converge two by two on a radius.

Such an arrangement ensures reciprocal bracing of the support arms, favorably modifies their vibrating characteristics, and thus improves their mechanical stability under vibration.

In addition, because the arms are no longer radial, the disturbance, which they create in the blades, does not influence the whole blade at the same time, but proceeds progressively along the blade. This characteristic considerably diminishes the amplitude of the disturbances which they may engender in the blading.

Finally, the absence of fastening means on the internal diameter of the housing eliminates a cause of aerodynamic disturbances at the base of the blades, a disturbance which is especially undesirable because of its tendency to induce a rotating stall.

BRIEF DESCRIPTION OF THE DRAWINGS

Other features and attendant advantages of the present invention will be more readily appreciated and better understood from the following detailed description when considered in connection with the accompanying drawings, in which like reference characters are used throughout the several views to identify like or corresponding parts, and wherein:

FIG. 3A is an elevation and front longitudinal cross-section of an assembly of two instrument-support arms disposed according to the invention;

FIG. 3B is a detail cross-section view of the fastening of one extremity of an arm to the turbojet housing;

FIG. 4 is a view of the fusiform joining body along line IV—IV of FIG. 3;

FIG. 5 is a cross-section of the fusiform joining body along line V—V of FIG. 4;

FIG. 6 is a cross-section of the fusiform joining body along line VI—VI of FIG. 3;

FIG. 8 is a cross-section along line VIII—VIII of FIG. 3; and

FIG. 9 is a cross-section along line IX—IX of FIG. 3.

DETAILED DESCRIPTION OF A PREFERRED EMBODIMENT

Figure 1:
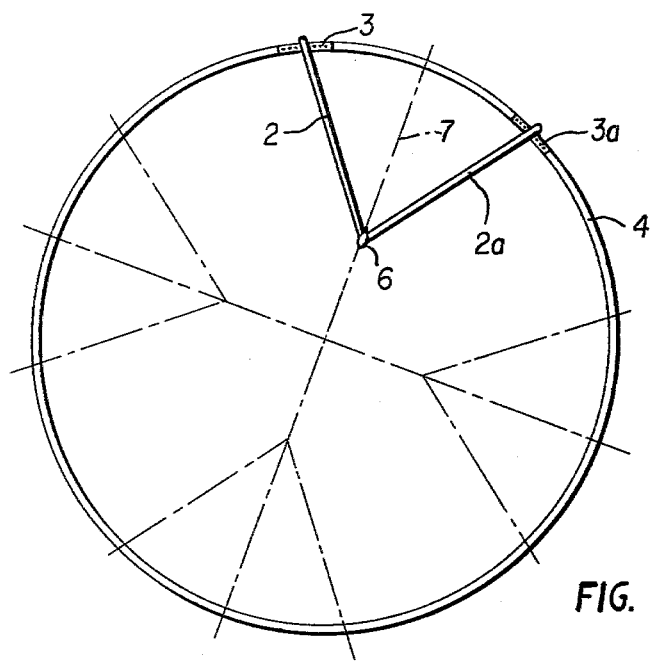
FIG. 1 is a front view elevation of a support device for measuring instruments mounted on the air intake of a turbojet.
Figure 2:
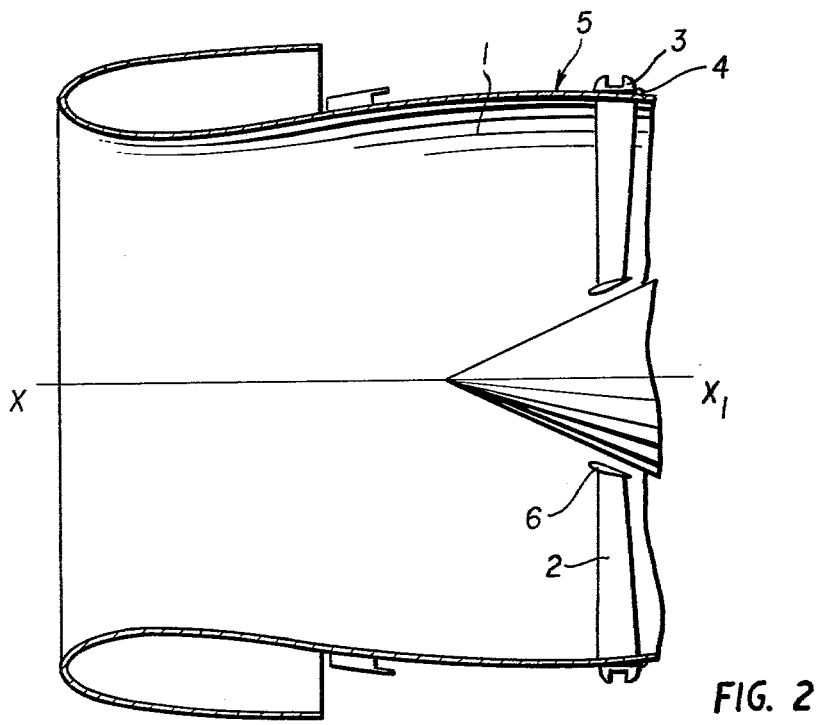
FIG. 2 is a longitudinal cross-section of the device mounted on the air intake of a turbojet.

FIGS. 1 and 2 represent an air intake 1 located on a turbojet fan, in which are disposed arms 2, 2a for support of pressure measuring instruments spaced along at least one part of the length of arms 2.

According to the invention, arms 2, 2a are mounted at one of their extremities by means of clamps 3, 3a on a flange 4 of the outer housing 5 of the turbojet and are joined at their other extremities by means of a fusiform body 6. Arms 2, 2a are mounted so as to converge in pairs upon a radius 7 and are disposed in pairs, as shown in FIG. 1, around the circumference of the turbojet housing in a plane perpendicular to axis $XX_1$ of air intake 1.

Figure 7:
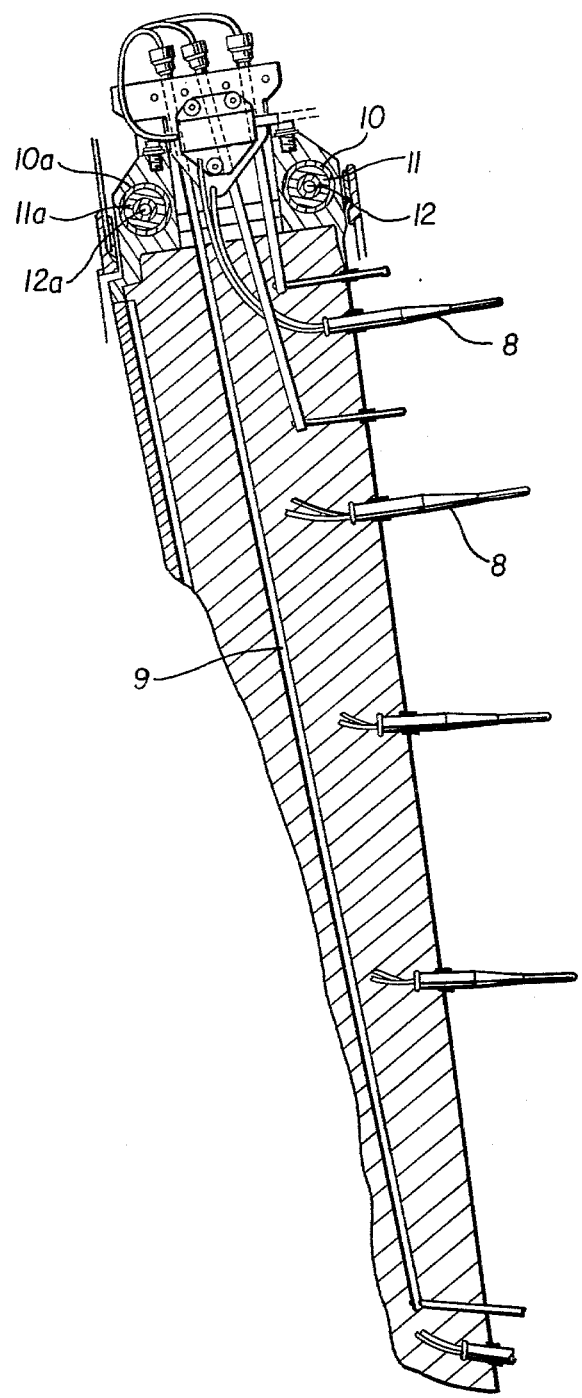
FIG. 7 is a cross-section of an instrument support arm along line VII—VII of FIG. 3.

As shown in FIGS. 3A and 7, support arms 2 and 2a, composed of sectional elements, comprise pressure taking instruments 8 mounted at intervals along the length of each arm and connected by internal wires 9 to a central unit comprising the aircraft control compartment.

At their outer extremity, arms 2 and 2a (FIGS. 3B and 7) comprise two spherical surfaces 10, 10a in which are mounted two ball joints 11, 11a having a bore intended to receive pins 12, 12a mounted on forks 13, 13a (not visible) which are integral with a clamp 3 affixed by means of bolts 14, 15 (FIGS. 3B, 8 and 9) on flange 4 of the outer turbojet housing.

Fusiform body 6 for joining the inner extremities of arms 2, 2a (shown in more detail in FIGS. 4, 5 and 6) is composed of a fork 16 provided at one extremity of one of the arms 2a, between the branches of which is disposed a stud 17 provided at one extremity of the other arm 2, the fork and stud having a bore in which is engaged a threaded axle 18, the downstream extremity 19 of which is fusiform, and the threaded portion of which receives a fusiform nut 20 comprising slots 21, into which drop the tabs of a locking device 22.

Various modifications may of course be made by those skilled in the art of the processes and devices which have just been described by way solely of example and without limitation, without departing from the scope of the invention.

What is claimed as new and desired to be secured by Letters Patent of the United States is:

1. A support device for measuring instruments in the air intake of a turbojet, particularly pressure measuring instruments, comprising:

a plurality of support arms on which pressure measuring instruments are mounted at intervals along at least a part of the length thereof;

said support arms, extending within a plane perpendicular to the longitudinal axis of the air intake, and being mounted at one of their extremities on the turbojet housing;

said support arms further being joined in pairs at their other extremities by means of a fusiform body and being mounted so as to converge in such pairs upon a radius.

2. A device according to claim 1, wherein said support arms are mounted at their inner extremities on at least one ball joint in which is engaged a fastening axle mounted on a fork integral with a clamp affixed to a flange on an outer turbojet housing.

3. A device according to claim 1, characterized wherein said fusiform body for joining the inner extremities of each pair of arms is constituted by a fork provided at one extremity of one of the arms, between the branches of which is disposed a stud provided at one extremity of the other arm, said fork and stud providing a bore in which is engaged an interlocking component comprising a fusiform part at its two extremities.

4. A device according to claim 3, wherein said interlocking component is composed of a threaded axle engaged in the bore provided in the fork and stud and comprising a fusiform extremity, said axle receiving on its threaded portion a fusiform nut equipped with a locking device.

* * * * *